2 Sheets—Sheet 1.
A. DOUGLAS.
Store Truck.
No. 35,908.
Patented July 15, 1862.
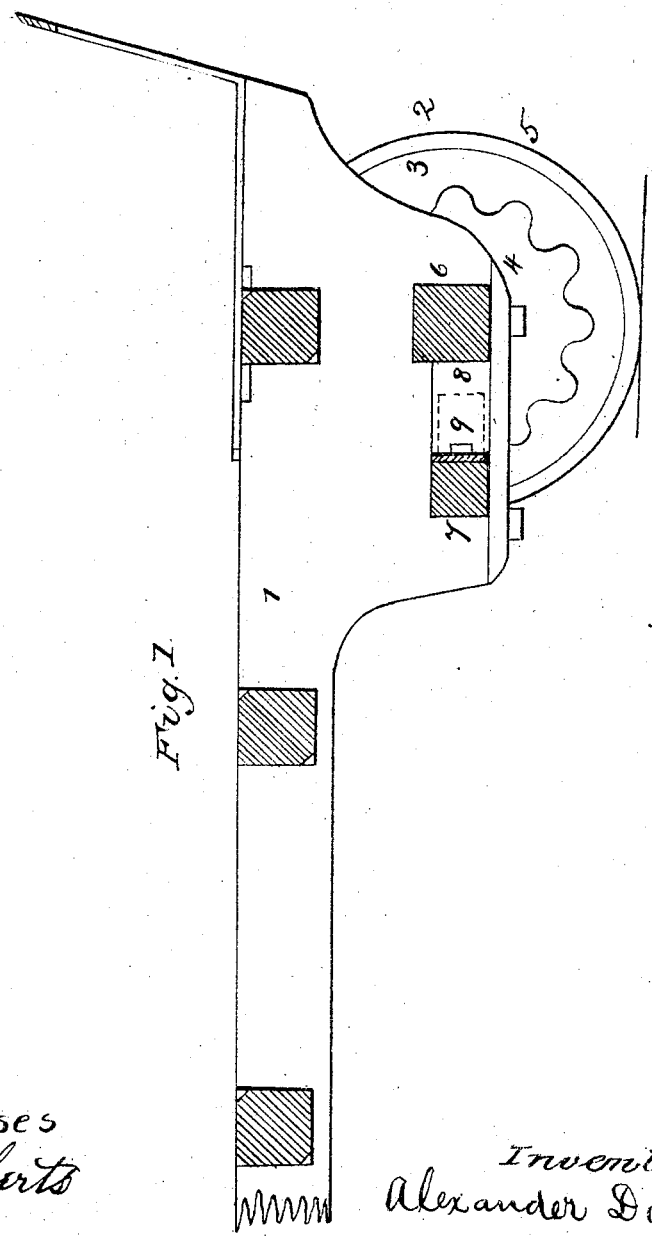
Witnesses
L. A. Roberts
H. James Weston
Inventor
Alexander Douglas
By Thos S How
Atty

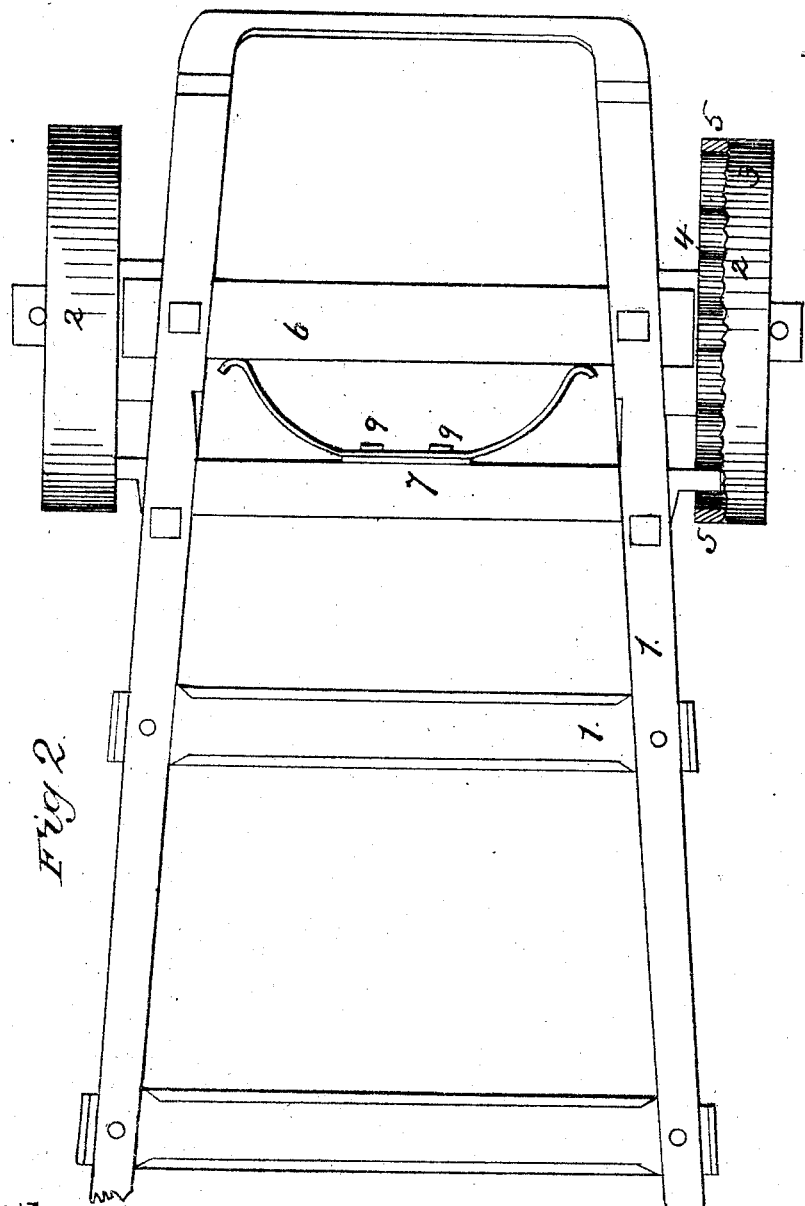
A. DOUGLAS.
Store Truck.
No. 35,908.
2 Sheets—Sheet 2.
Patented July 15, 1862.

UNITED STATES PATENT OFFICE.

ALEXANDER DOUGLAS, OF ENGLISH NEIGHBORHOOD, ASSIGNOR TO HIMSELF, AND S. S. SHERWOOD, OF ACQUACKANONCK, NEW JERSEY.

IMPROVEMENT IN STORE-TRUCKS.

Specification forming part of Letters Patent No. 35,908, dated July 15, 1862.

*To all whom it may concern:*

Be it known that I, ALEXANDER DOUGLAS, of English Neighborhood, in the county of Bergen and State of New Jersey, have invented an Improvement in Store-Trucks, of which the following is a specification.

It is a common subject of annoyance and complaint among those who use this class of trucks that when putting a heavy box, bale, or other article upon them they are very liable to run back from the article, thus rendering it a very difficult matter for one man alone to load them.

My invention is intended to obviate this difficulty, which it does in a very perfect manner.

It consists in a combination of a ratchet or toothed wheel on the inside of and forming a part of each wheel of the truck, a bar or pawl running through the body of the truck and reaching far enough over the face of the toothed wheels to mesh into them when it is pressed down by the foot, and thus effectually block the wheels of the truck, and a spring to hold the bar or pawl back out of the way when not in use, as hereinafter set forth.

In the drawings, Figure 1 is a longitudinal vertical section of a truck with my improvement attached. Fig. 2 is an under side view of the same.

1 is the body of the truck, the handles, which do not differ from those in common use, being broken off in order to save room upon the page.

2 2 are the wheels of the truck. They are made up of the following parts: the main disk or wheel 3, the ratchet or toothed wheel 4 on the inside face of each main disk, and a rim or guard, 5, for the protection of the toothed wheel 4.

6 is the axle of the truck.

7 is the bar or pawl, the ends of which, by meshing into the teeth on the wheels 4 4, block the wheels of the truck. This bar or pawl 7 is held back, when not in use, by the spring 8, which is bolted to it by the bolts 9 9.

10 is the sharp edge or beak of the truck, which is forced under the edge of a package before it is canted over on the truck.

When using a truck with my improvement attached, the front iron edge or beak is thrust under the edge of the package. The foot then presses down upon the bar or pawl 7, which is forced down upon the ratchet-wheel 4, and prevents the truck from running back while the package is drawn or canted over upon the truck. After this is done the foot is withdrawn from the brake-bar 7, which is thrown back by the spring 8, thus leaving the wheels of the truck free to revolve. The same object may, perhaps, be accomplished by hanging the brake-bar 7 in such a manner that there shall be sufficient leverage upon the periphery of the wheels of the truck to stop their rotation when the brake-bar is forced against said wheels by the pressure of the foot.

I claim—

The combination, with the store-truck, of the brake-bar 7, or its equivalent, by which the rotation of the wheels is prevented at the time of loading the truck, when the said brake-bar is so arranged in relation to the other parts of the truck as to be easily accessible to the foot of the operator, substantially as herein set forth.

ALEX. DOUGLAS.

Witnesses:
L. A. ROBERTS,
H. JAMES WESTON.